Dec. 6, 1927. 1,651,839
M. H. ROGERS
SCREEN AND SEAL FOR AUTOMOBILE DOORS
Filed July 12, 1926   2 Sheets-Sheet 1
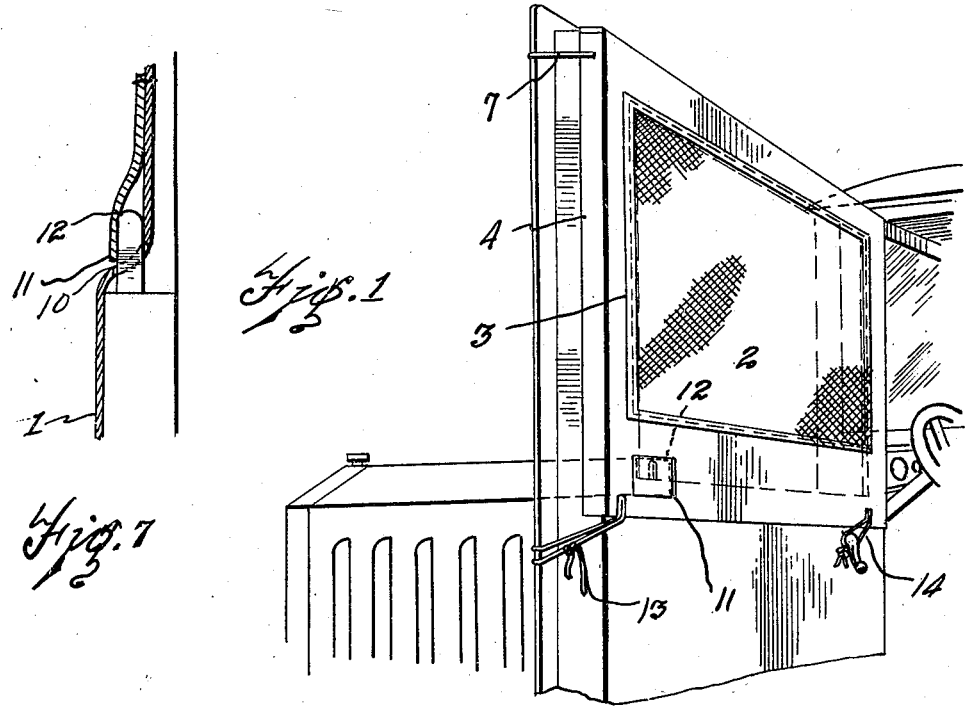
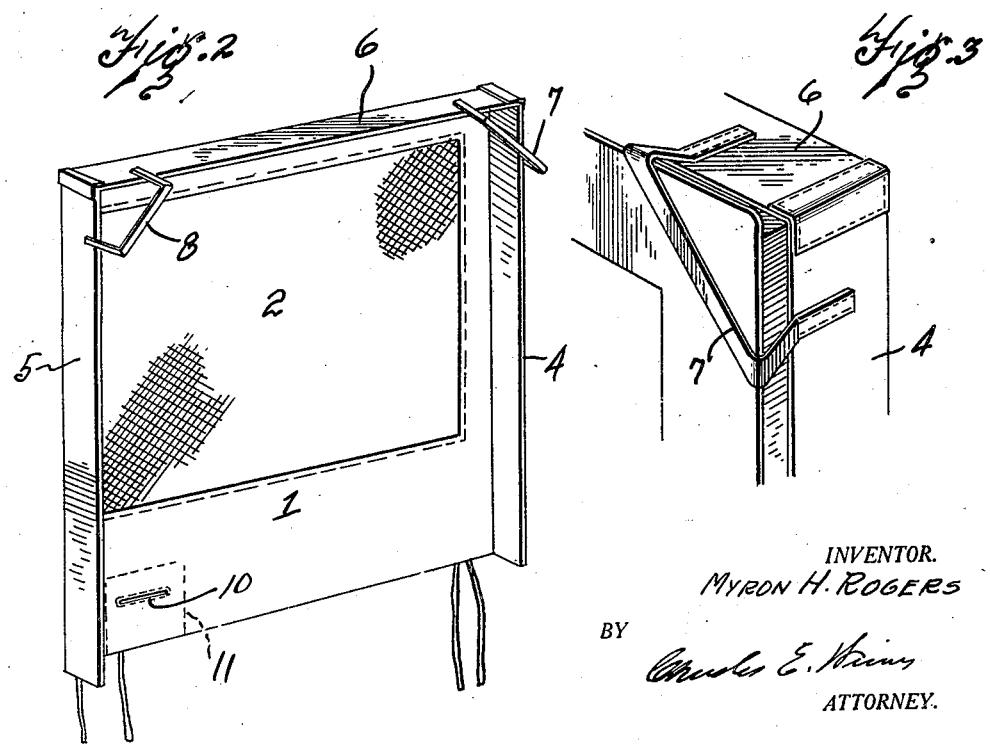
INVENTOR.
MYRON H. ROGERS
BY
ATTORNEY.

Dec. 6, 1927.
M. H. ROGERS
1,651,839
SCREEN AND SEAL FOR AUTOMOBILE DOORS
Filed July 12, 1926    2 Sheets-Sheet 2
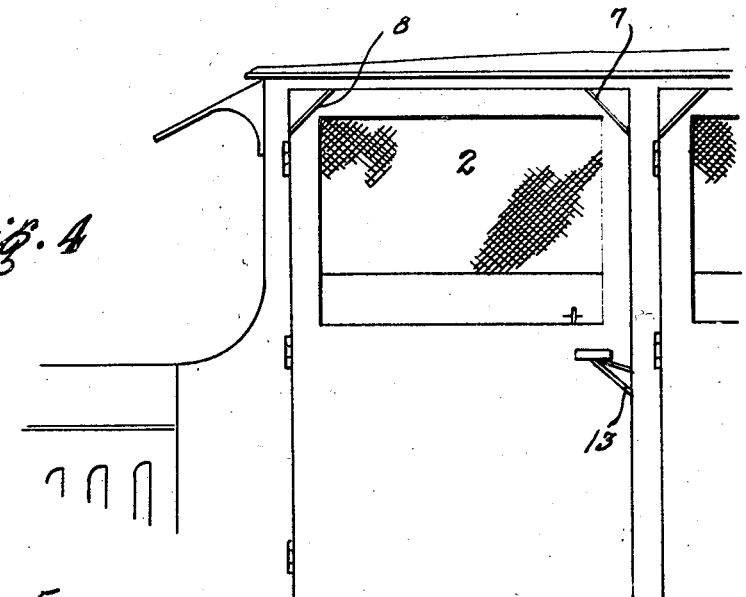
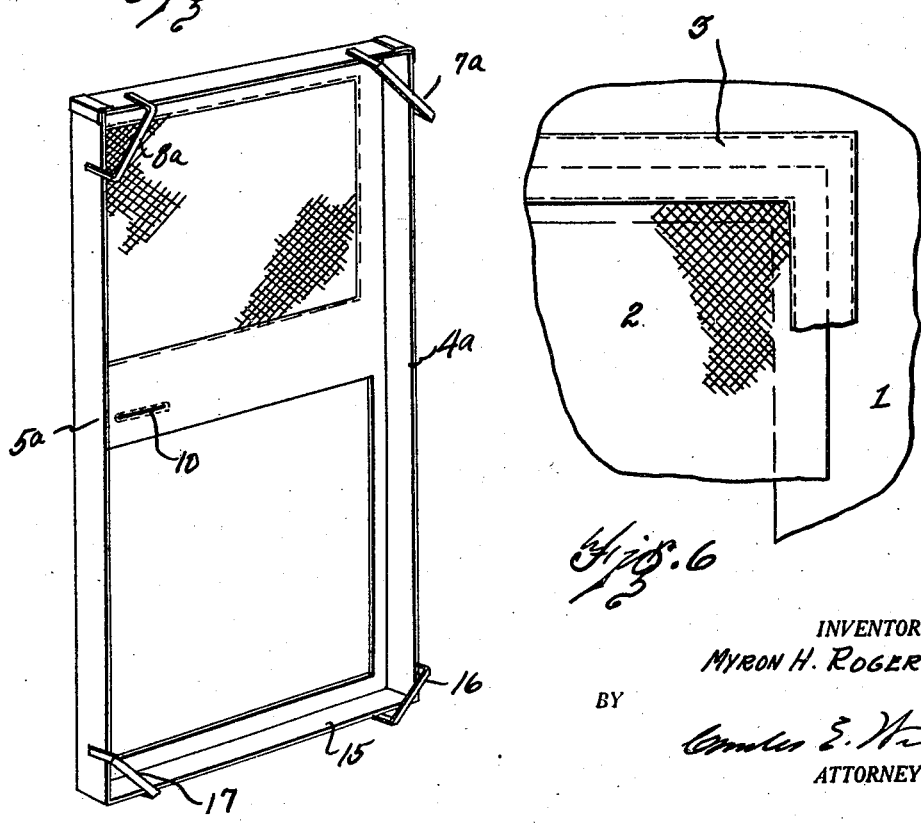
INVENTOR.
MYRON H. ROGERS
BY
ATTORNEY.

Patented Dec. 6, 1927.

1,651,839

UNITED STATES PATENT OFFICE.

MYRON H. ROGERS, OF DEARBORN, MICHIGAN.

SCREEN AND SEAL FOR AUTOMOBILE DOORS.

Application filed July 12, 1926. Serial No. 121,760.

This invention relates to a seal and screen for automobile doors.

The object of the invention is to provide a screen adapted to be supported on a door of an automobile of the closed body type and to at the same time seal the interstice between the door and its frame to prevent ingress of insects into the interior of the body thus providing a mosquito and insect-proof compartment permitting use of the automobile as sleeping quarters in touring.

Heretofore persons in touring in desiring to utilize the automobile body as sleeping quarters are either without any protection at all against the ingress of insects or must of necessity cover the entire vehicle with mosquito netting or the like. This invention seeks to avoid the inconveniences incident to such arrangement and to provide a simple and inexpensive device that is supported directly upon the door of the vehicle for use with a closed body type of vehicle in which the sash member may be raised or lowered from the interior while the screen member is in position permitting free ventilation through screened openings.

A feature of the invention is in the arrangement of the screen member on the inside of the door and with an outturned flap over the door edge both at the top and the sides sealing the interstice between the said door and the surrounding frame.

These and other objects and the several novel features of the invention are hereinafter more fully described and claimed, and the preferred form of construction of a screen embodying my invention is shown in the accompanying drawings in which—

Fig. 1 is a view in perspective showing my screen in position on the door of an automobile.

Fig. 2 is a perspective view of the screen member in its preferred form.

Fig. 3 is a detail in perspective showing the arrangement of supporting strip for retaining the screen in position.

Fig. 4 is an external view of a portion of an automobile body with my improved screen in place.

Fig. 5 is a detail in perspective showing an alternative form of my invention.

Fig. 6 is a detail of a portion of the device showing the general method of attaching the screen member to the canvas or fabric frame portion.

Fig. 7 is a detail in section showing the flap provided to cover the handle opening when the screen is mounted on the door.

The invention is possibly best illustrated in Fig. 1 in which the open door of the vehicle is shown with the screen member supported on the inner face thereof. My improved device consists of a fabric portion indicated at 1 which may be considered as providing a frame for the screen portion 2 which is secured thereto preferably by means of a strip 3 sewed to the fabric portion 1 with the edge of the screen member between the strip and the fabric as shown in Fig. 6. This fabric portion 1 is formed to provide lateral flanges 4, 5 and 6 upon the two sides and top portion thereof respectively. These flanges extend over the top portion thereof in the preferred form shown in Fig. 2. As will be understood from Fig. 3 at each upper corner is provided a strip 7 and 8 respectively adapted to slip over the corner of the door with the flanges 4, 5 and 6 fitting over the edge of the door. The screen member 2 is nearly as large as the sash opening in the upper part of the door and the lower side of the fabric portion 1 usually extends below the operating handle for the door and for this reason I provide an aperture 10 in the fabric member through which the door operating handle may extend. Preferably a flap 11 is provided of practically rectangular form as indicated in Figs. 1 and 2 which normally covers this aperture and is free from the fabric at one edge and between this free edge and the body of the fabric 1 the handle 12 extends as will be readily understood. This flap member may be dispensed with without departing from the spirit of this invention but preferably such a flap is used to insure closing of the aperture through which the handle member extends.

As previously stated the upper end of the screen member is secured over the corners of the door by the straps 7 and 8 and, to draw this screen member taut against the inner face of the door, I provide the straps 13 and 14 on opposite corners, the strap 13 being brought outwardly about the door edge and tied over the outside handle, while the strap 14 may be secured in any convenient manner as to the hinge or to the sash opening handle as shown in Fig. 1.

It will be understood from Fig. 1 that this screen member is supported on the inside of the door and with the flanges 4, 5, and 6 extending over the edge of the door and thus, when the door is closed, the screen member is on the inside and the flaps in the interstices between the door edge and its frame preventing ingress of insects at that point. In the form of my device shown in Figs. 1 and 2 only half the door is covered which is ordinarily sufficient for the reason that in the use of the vehicle for sleeping purposes the bed is made up to a height of about one-half the door length and thus mosquitoes and similar insects, that might possibly enter the vehicle body from the floor or through the interstice between the door and frame below the screen member in the form shown in Fig. 1, are prevented from entering that portion of the vehicle that is occupied as sleeping quarters and thus ordinarily a screen and seal shown in Figs. 1 and 2 is sufficient. In the event, however, it is desired to seal the door about its entire periphery I provide a screen form shown in Fig. 5, the upper portion of which is identical with that shown in Fig. 2 and in addition has the side flaps 4ª and 5ª, corresponding to the flanges 4 and 5 of Fig. 2, which extend the full length of the door and are connected at the bottom by a cross flap 15. These sealing flanges are supported on the door by straps 16 and 17 provided at opposite corners corresponding to the straps 7ª and 8ª for the upper corners as indicated.

With this screen member in position and the doors of the vehicle being closed, the screen cannot be taken off nor can it become accidentally displaced under any ordinary condition. Furthermore, by the arrangement and form of my device, the operation of the sash is not interferred with in any manner, it being possible to raise or lower the same without disturbing the screen member. This is of value in that if, for any reason, as for instance storm arising during the night while the glass is in lowered position for the purpose of ventilation, the vehicle body can be closed tight against rain or storm without necessity of removal of the screen members and thus, by my arrangement of the screen and sealed automobile door, I am able to provide a compartment for sleeping quarters that is of ample size; that is mosquito and insect proof; provides for free ventilation; that is practically storm proof; requires no great effort in erection or dismantling, and is very inexpensive in comparison with the usual camping outfits which require considerable labor and time in erection.

Having thus briefly described my invention, what I claim and desire to secure by Letters Patent of the United States is—

1. In combination with an automobile door having an opening therein and a sash member movable to open or close the said opening, a screen and seal member consisting of a fabric body of a size providing edge portions turned over the top and side edges of the door, means supporting the screen member in position on the door, there being an opening in said fabric corresponding to the opening of the door and practically in registration therewith when mounted thereon, and a screen secured to the fabric and covering the opening therein.

2. A screen and seal for automobile doors having an opening consisting of a fabric body of practically rectangular shape, the said body having side and upper flap portions adapted to lie over the side edges and top of a door, the said fabric body having an opening corresponding in size to that of the door opening and adapted to register substantially therewith, a screen member secured to the fabric and covering the opening, a loop secured to each upper corner of the member adapted to slip over the corners of the door to hold the upper end of the fabric in position, and tie straps at the lower side of the fabric body adapted to be secured to a portion of the door and to draw the fabric body practically taut over the inner face of the door, there being an opening provided in the lower portion of the fabric member for the door handle, and a cover for the said opening.

3. A seal and screen for an automobile door having a closable opening consisting of a fabric body portion having an opening, a screen member secured thereover, the said fabric portion having edge flaps adapted to lie over the edge of the door with the screen member on the inner face of the door, and means for drawing the fabric member taut and in fixed relation with the door to swing therewith with the flaps lying in the interstices between the door and its frame when closed.

In testimony whereof, I sign this specification.

MYRON H. ROGERS.